United States Patent

Momose

[11] 3,936,187
[45] Feb. 3, 1976

[54] DISTANCE MEASURING DEVICE

[75] Inventor: Haruhiko Momose, Tokyo, Japan

[73] Assignee: Konishiroku Photo Industry Co., Ltd., Hino, Japan

[22] Filed: Feb. 19, 1974

[21] Appl. No.: 443,359

Related U.S. Application Data

[63] Continuation-in-part of Ser. No. 273,220, July 19, 1972, abandoned.

[52] U.S. Cl. .................. 356/1; 356/4; 354/25; 250/211 K
[51] Int. Cl.² .................. G01C 3/00; G03B 7/08
[58] Field of Search .................. 356/1, 4, 141, 172; 250/211 K; 354/25

[56] References Cited
UNITED STATES PATENTS

| | | | |
|---|---|---|---|
| 3,222,531 | 12/1965 | Morrison | 250/211 K |
| 3,443,502 | 5/1969 | Harvey | 95/44 C |
| 3,652,160 | 3/1972 | Odone et al. | 95/44 C |
| 3,723,003 | 3/1973 | Vockenhuber et al. | 356/4 |

Primary Examiner—Maynard R. Wilbur
Assistant Examiner—S. C. Buczinski
Attorney, Agent, or Firm—George B. Oujevolk

[57] ABSTRACT

A distance measuring device comprising a flood-light projecting means having a flashing device adapted to direct a flashlight to an object to be photographed, a light receiving means incorporating a light slide rheostat disposed at a predetermined distance from said projecting means and a lens adapted to allow light rays reflected from said object to impinge, in the form of a beam, on the light receiving surface of said rheostat, a converting means for converting the variation of the resistance amount of said rheostat into the variation of voltage and an indicating means for indicating said voltage variation, particularly useful in photographic cameras. Also, an automatic focusing device having the same constructional features as the aforesaid distance measuring device, except that it has an objective lens adjusting means operated by said voltage variation instead of said indicating means.

7 Claims, 6 Drawing Figures

DISTANCE MEASURING DEVICE

This is continuation-in-part application of Ser. No. 273,220 filed July 19, 1972, now abandoned.

BACKGROUND OF THE INVENTION

The present invention relates to a distance measuring device, and more particularly to a distance measuring device for use in measuring a distance from a picture taking position to an object to be photographed and to an automatic focusing device for a camera utilizing said distance measuring device.

BRIEF DESCRIPTION OF THE PRIOR ART

A similar type distance measuring device has conventionally been known that utilized a phenomenon that when an image of an object to be photographed, which is illuminated by light rays from a light source, whether daylight or artificial light in nature, disposed at a distance from the picture taking position, is projected on a photoconductive element disposed near the picture taking position, the resistance of the photoconductive element disposed near the picture taking position shows a measurable change when the image is focused on the light receiving surface of the element. However, such device does not function satisfactorily in determining the distance concerned unless the object is properly illuminated.

There have also been other kinds of range finders. For example, U.S. Pat. Nos. 3,435,744 and 3,443,502 disclose a distance measuring device that makes use of, as a distance determining information, a change either in the angle at which a photoconductive element is directed toward the object being photographed or in the position at which the element can receive the light rays reflected therefrom on the element. Such device also has several shortcomings. For example, it can not afford a highly reliable measurement value because of too great an influence of other light beams, for example those of daylight, which act on the photoconductive element. The accuracy of the measurement is also low since its distance determining information is based on such mechanical displacement as the changes in position or angle of the element. Particularly when they are used for an automatic focusing device, there is a danger of causing erroneous focus adjustments. Other prior art devices of interest are U.S. Pat. Nos. 3,274,913, 3,336,851, 3,628,863 and U.S. Pat. No. 3,517,992.

U.S. Pat. Nos. 3,517,992 and 3,628,863 disclose arrangements wherein the light from an image is directed onto a light-receiving section to detect the position of a slide, said light-receiving section consisting of a pair of photoelectric elements arranged in parallel. The configuration of a slit is a very important factor for achieving an accurate measurement. The position of the slide at the moment when the motor stops depends on whether the slit has a symmetrical or asymmetrical configuration. When such an arrangement is used, the accuracy and capability of a measurement depends on the configuration of the slit or the configuration of an object to be measured. Thus, this arrangement cannot be used as an automatic focusing device for a camera wherein the light from objects having random configurations is directed onto the light receiving surfaces.

OBJECTS OF THE INVENTION

A principal object of the invention is to provide a distance measuring device that serves an automatic focusing device in Photographic cameras, by obviating the aforesaid shortcomings in the conventional distance measuring device.

Another object of this invention is to provide a distance measuring device having a flashing device and a photoelectric detector, so that a light is flashed from the light projecting means onto an object the distance to which is being determined and the light reflected therefrom is detected by the photoelectric detector disposed at a predetermined distance from the projecting means, while minimizing the influence of any other light than the flash light on the detector.

A further object of the invention is to attain a high measurement accuracy through the use of a light slide rheostat as the photoelectric detector thereby permitting the direct conversion of a distance to the object into a resistance amount of said light slide rheostat.

These and other objects of the present invention will be readily understood from the following detailed description taken with reference to the accompanying drawings, in which:

BRIEF DESCRIPTION OF THE DRAWING

FIG. 4b is a sectional view taken along line IV—IV of FIG. 4a; and

DETAILED DESCRIPTION

Figure 1:
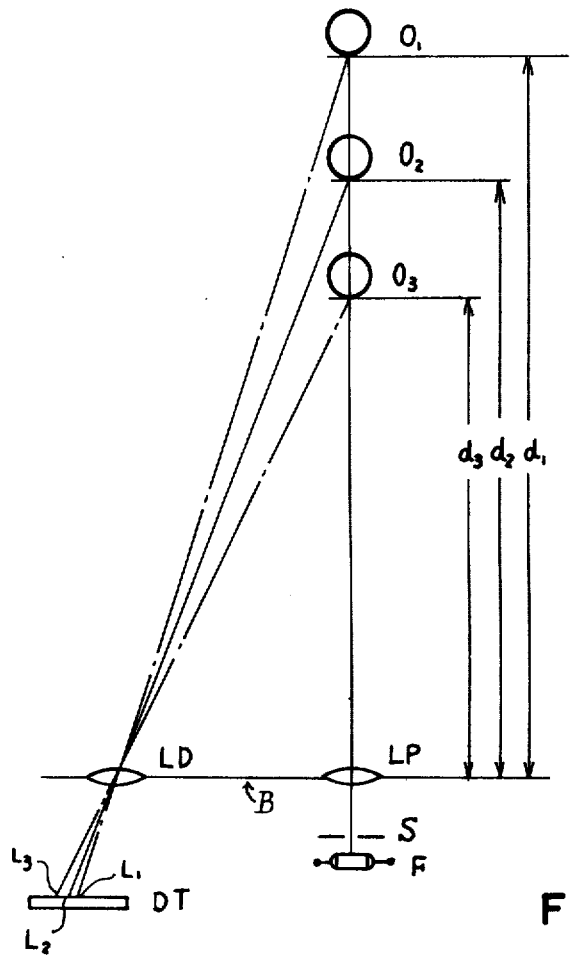
FIG. 1 illustrates diagrammatically an optical system to be employed in a distance measuring device according to the present invention.

Initially, reference will be made to the optical system shown in FIG. 1. A light emanated from a flashing device F, such as a flash lamp, as a distance measuring light is made into the form of a beam through a slit S and a projection lens LP and then is allowed to impinge on coaxially located objects $O_1$, $O_2$ and $O_3$ at different distances $d_1$, $d_2$ and $d_3$ respectively. Then the light rays reflected from the objects $0_1$, $0_2$ and $0_3$ are focused on a detector DT through a detecting lens LD disposed on a base line B through said projection lens LP. The light rays reflected from the different objects are focused at different positions on the light receiving surface of the detector DT; the light rays from a distance $d_1$ at position $L_1$, those from a distance $d_2$ at postion L2 and those from a distance $d_3$ and $L_3$.

Figure 2:
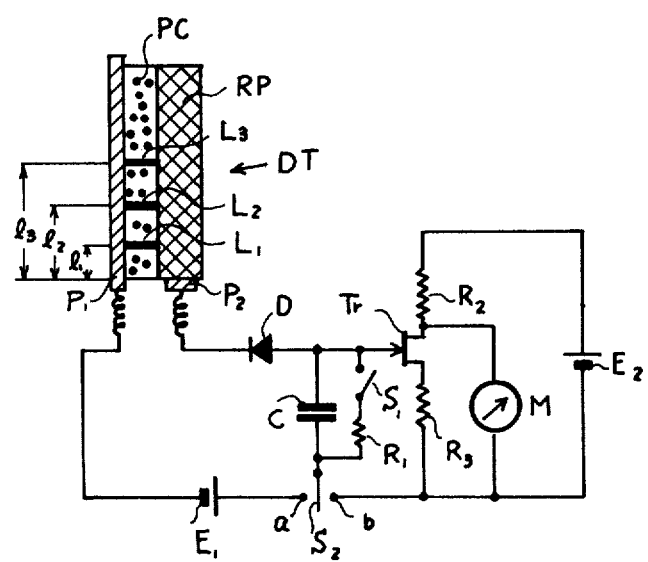
FIG. 2 is an electrical circuit diagram to be used in said distance measuring device.

As illustrated in FIG. 2, said detector DT comprises a pair of electrodes $P_1$ and $P_2$, a portion PC consisting of such a photoconductive material as CdS that makes quick response to light and a resistor RP, said photoconductive material PC being interposed between the electrode $P_1$ and resistor RP.

If the light beam impinges on the position $L_1$, the resistance amount of the photoconductive material at $L_1$ is reduced. The detector DT will then have a resistance amount $r_1$ which is in approximate proportion to a length $L_1$ from the base of the electrode $P_2$ to $L_1$, if it is assumed that the light resistance of the photoconductive material is negligibly low. Similarly, when the light beam strikes the position $L_2$, the detector DT will have a larger resistance amount $r_2$ than aforesaid $r_1$. When the light hits the position $L_3$, it will have a still larger resistance amount $r_3$. Since the resistance amount of the detector DT changes thus with the position on which the light beam impinges, it may be called a light slide rheostat.

In FIG. 2 reference characters $E_1$ and $E_2$ designate power sources, D a diode, C a condenser, $S_1$ a switch, $S_2$ a change-over switch, $R_1$, $R_2$ and $R_3$ resistors, $Tr$ a field effect transistor and M a meter.

When a change-over switch $S_2$ is connected to a contact(a) and the flashing device F emanates a flashing light, a voltage inversely proportional to the resistance amount of the detector DT or proportional to the distance from the object, for example, the distance $d_2$ when the light is reflected from the object $0_2$, is produced between the terminals of said condenser C. If the distance to the object is as large as $d_1$ in FIG. 1, the resistance of the detector DT will be as small as $r_1$ and therefore the voltage between the terminals of the condenser C will be high. In contrast, when the distance to the object is as small as $d_3$, the same voltage will become low. That is to say, the voltage set up between the terminals of the condenser C is proportional to the distance to the object. In other words, the condenser C memorizes the distance information.

By connecting the change-over switch $S_2$ to a contact (b), the field effect transistor $Tr_1$ will be conducted. If an N-type transistor is used for the field effect transistor $Tr_1$, its output voltage becomes higher as the terminal voltage of the condenser C increases.

Since the input impedance of the field effect transistor $Tr_1$ is high, its output voltage will have a constant value in correspondence to said terminal voltage of the condenser C.

By reading this output voltage on the meter M, the distance to the object can be measured. On completing the measurement of the distance, the switch $S_1$ will be closed to by-pass the electrical charge accumulated in the condenser C. The diode D is adapted to prevent said electrical charge from flowing backward before the switch $S_2$ is turned from the contact (a) to (b) after the flashing device F has been put out. Furthermore, it is preferable to use a cylindrical lens for the lens LD so that the incoming light to the detector DT will be admitted in the form of a bright line as illustrated in FIG. 2.

Figure 3:
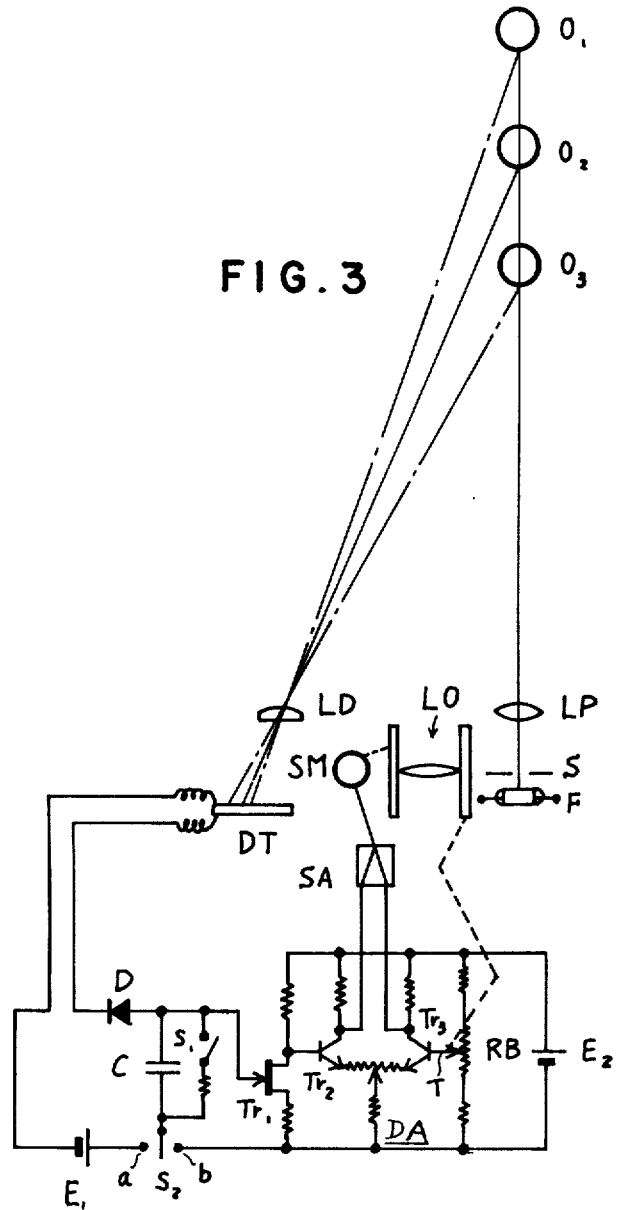
FIG. 3 is a diagrammatic view showing the construction and electrical circuit of an automatic focusing device built in a photographic camera by utilizing the distance measuring device according to the present invention.

FIG. 3 schematically illustrates the construction of an automatic focusing device that is designed to make automatic focusing on the basis of the distance value thus determined. In this device, the output of the field effect transistor $Tr_1$ is present at the base of a transistor $Tr_2$ in a differential amplifier that comprises transistors $Tr_2$ and $Tr_3$, a potentiometer RB, power source $E_2$, etc. The output of said differential amplifier is amplified by a servo-amplifier SA and then used for driving a servomotor SM that is adapted to actuate an objective lens LO in the direction of the optical axis there of. A slidable terminal T of the potentiometer RB is interlocked with said lens LO.

As described hereinabove with reference to FIG. 2, a voltage corresponding to the distance to the object is produced between the terminals of the condenser C when the change-over switch $S_2$ is connected to the contact (a) and the flashing device F is flashed. While, on connecting said switch $S_2$ to the contact (b), the same amount of voltage is produced on the output side of the field effect transistor $Tr_1$. When any difference arises between the outputs of the transistors $Tr_2$ and $Tr_3$ following the variation of the output of the field effect transistor $Tr_1$, the servomotor SM will rotate to make up this difference. Accordingly, if the relation between the delivery amount of the photographic objective lens LO and the performance characteristics of the potentiometer RB is properly adjusted, said lens LO will always be stopped at such a position that assures correct focusing on the film surface FS irrespective of the distance to the object.

As previously mentioned the present invention will distinguish between the light reflected from the object which is illuminated by the flashing device and daylight reflected from other objects. This is accomplished by using a flashing light on the objective.

According to the present invention, a light source which is adapted to emit a slit-like light ray is located on the front side of a camera at a predetermined distance from a light slide rheostat which produces resistance of different values in response to displacement of the slit-like light ray.

The slit-like light ray, upon projection on an object, produces a linear bright portion on the object and the image of the linear bright portion of the object is focused at a certain position of the detector DT through the detector lens LD. The focusing position on the detector DT is shifted to the right or left depending upon the distance to the object, producing corresponding variations in the output resistance of the detector DT.

Thus, as the output resistance value of the detector DT is in proportional relationship with the distance from the camera to the object to be photographed, it is possible to measure steplessly the exact distance to the object in terms of the variations in the output resistance of the detector DT.

This is extremely advantageous in that the distance to the object can be measured with a high degree of accuracy which cannot be attained with the existing photographic distance measuring devices.

Furthermore, according to the present invention, a voltage variation resulting from a resistance variation in a light slide rheostat is memorized in a condenser C, so that it is not required to project the object illuminating light continuously on the object. Namely, the measurement of the distance can be attained with use of a flash of light, to a great advantage.

In this connection, except for a photographing operation in a dark place, the object usually has a certain luminosity due to incidence of light rays from other light source, it is necessary for the measuring purposes to use a light ray of a particular wavelength or a light ray of a particular duration to allow detection by the light slide detector.

In consideration of light absorption by the object per se, the object illuminating light should preferably have sufficient intensity no matter whether it is of a particular wavelength or of a short duration.

For these reasons, the present invention employs a flashing device as an internal light source which can produce an intense pulsed light ray such as a strobe light or speedlight brighter than daylight to allow distance measurements without being influenced by light noises including daylight and light rays reflected from other objects.

Figure 4A:
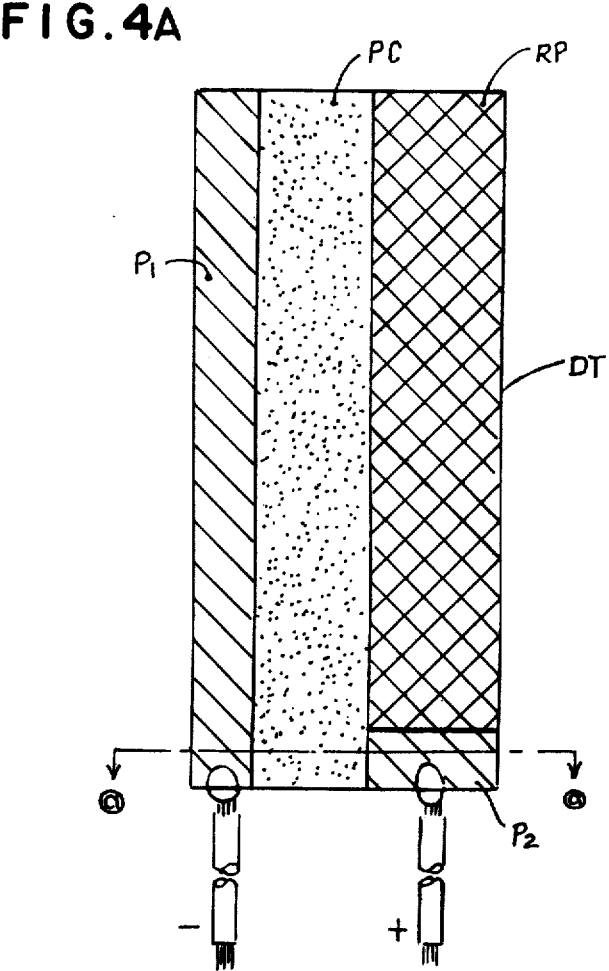
FIG. 4a is a diagrammatic view showing detailed construction of a light slide rheostat constituting the detector shown in FIGS. 1 and 2.
Figure 4B:
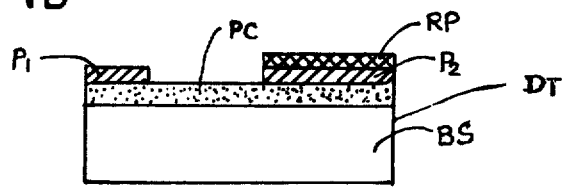

Referring to FIGS. 4a and 4b which show in detail the construction of the light slide rheostat employed as a detector in the present invention, the light slide rheostat comprises as shown a substrate BS, a photoconductive layer PC formed on the substrate BS from a suitable photoconductive material such as CdS which has quick response to light, a pair of electrodes $P_1$ and $P_2$ disposed at a distance from each other on the opposite sides of the photoconductive layer PC, and a resistor RP provided on one of the electrodes, to attain the operation as described hereinbefore.

Figure 5:
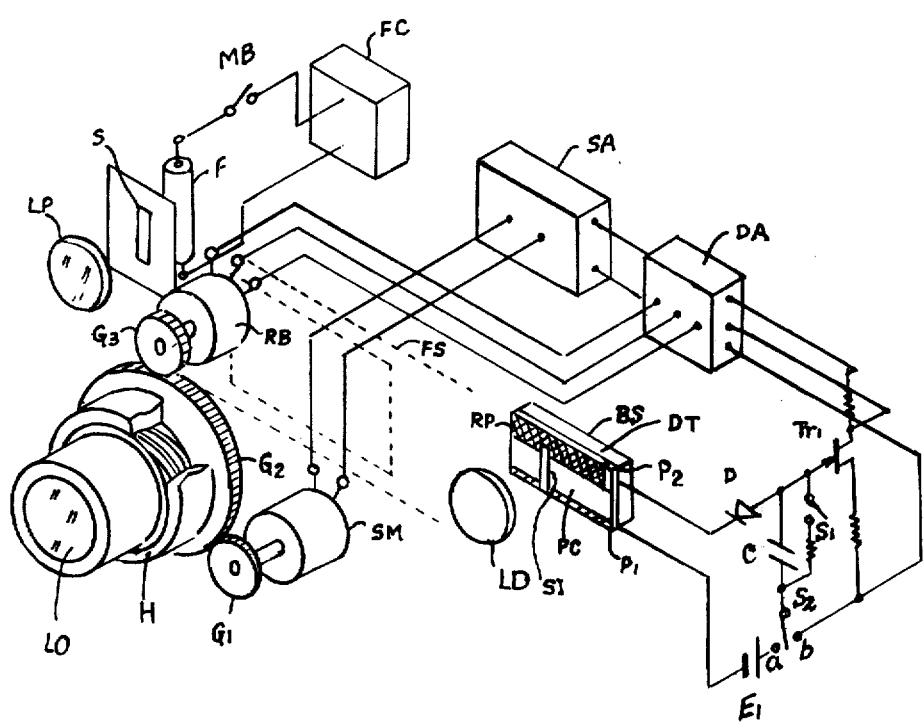
FIG. 5 is a fragmentary diagrammatic view showing relative positions of various component parts of a camera employing the automatic focusing device of FIG. 3.

Relative positions of the respective component parts of the automatic focusing device of FIG. 3 as built in a camera will now be explained hereafter with reference to FIG. 5. There are mounted on the camera body on opposite sides of the objective lens LO a projection lens LP of a floodlight projecting means F such as a flashbulb for projecting distance measuring light through a slit S of a slit plate and a detecting lens LD which is adapted to receive reflections of the light projected on the object ($0_1$, $0_2$ or $0_3$) through the slit S for forming a slit image on the light receiving surface of the detector, both the projection lens LP and the detecting lens LD being in alignment on the base line B as mentioned hereinbefore with reference to FIG. 1.

The camera body has further built therein a flashing circuit for actuating the floodlight projecting means F, along with a distance measuring switch MB which can be manupulated from outside.

One electrode $P_1$ of the detector DT which is mounted on the camera body is connected to a negative terminal of the power source $E_1$ which the other electrode $P_2$ is connected to a positive terminal of the power source through the diode D, condenser C and contact ($a$) which contacts a movable member of the change-over switch $S_2$. A bypass circuit is connected in parallel to the condenser C to the node between the diode D and capacitor C and the node between the condenser C and change-over switch $S_2$. The aforementioned node between the condenser C and diode D is connected to a gate of the field effect transistor $Tr_1$ while the drain from the field effect transistor $Tr_1$ and the voltage imposed on the contact ($b$) by the movable contact of the change-over switch $S_2$ are fed respectively to input terminals of the differential amplifier DA. One output terminal of the differential amplifier DA is connected to an input terminal of a servo amplifier SA while the other output terminal is connected to an input terminal of the potentiometer RB. The output terminal of the afore-mentioned servo amplifier SA is connected to an input terminal of the servo motor SM which has securely mounted on the rotating output shaft thereof a gear member $G_1$ for meshing engagement with the afore-mentioned gear $G_2$. The gear $G_2$ is also held in meshing engagement with a gear $G_3$ which is adapted to shift the sliding terminal of the potentionmeter RB (indicated at T in FIG. 3). It should be noted that the component parts as mentioned above are all mounted within the camera body.

Thus, with the automatic focusing device built in a camera body in utilization of the distance measuring means according to the present invention, the movable contact of the change-over switch $S_2$ is first connected to the contact $a$ and then the distance measuring switch MB is closed. The information indicative of the distance to an object is supplied to and memorized in the condenser C by way of the detector DT. Upon shifting the movable contact of the change-over switch $S_2$ to the contact $b$, the servo motor SM is driven from the output of the differential amplifier DA, thereby moving back and forth the objective lens LO of the camera for focusing an image correctly on the film surface FS. The focusing operation has been already described hereinabove with reference to FIGS. 1 and 3 so that no further explanation will be given herein in this regard.

It is to be observed therefore that the present invention contemplates applying a flashing light to an object the distance to which is to be measured and detecting a light reflected therefrom by means of the photoelectric detector. This makes it possible to reduce to a minimum the influence of any other light than said flashing light on the detector by emitting a strong light from a small light source to the detector.

Another advantage of this invention is that it permits highly accurate focusing through the use of a light slide rheostat as the photoelectric detector, which enables the direct conversion of the distance to the object into the resistance amount of the rheostat.

Furthermore, it will be understood that the distance measuring device according to the present invention always allows the performance of proper lens focusing independently of the illumination condition of the object under daylight or the like. Also, it will be understood that it can be sufficiently used not only as a range finder, but also as an automatic focusing device in the photographic cameras that require extra high accuracy.

It is further to be observed that the present invention contemplates an improvement in an automatic focusing device, and generally provides for flashing means (F), a slit (S) and a projection lens (LP) disposed in front of the flashing means so as to direct flashing light on an objective. Detector means (DT) including a detecting lens (LD) are disposed to receive flashed light reflected from said objective; said detector means (DT) serving as a light slide rheostat and including first and second electordes ($P_1$, $P_2$) a resistor (RP) with a photoconductive material (PC) interposed between one of said electrodes and said resistor. The other electrode is at one end of said resistor so that the electrical output between said two electrodes varies with the position where a light beam strikes the photoconductive material (PC); said first electrode has a lead which can be connected to one terminal of a power source ($E_1$); said second electrode has a second lead connected to a series circuit ending in the second terminal of a power source ($E_1$).

This series circuit has a diode (D) connected to said second lead, a first junction, a condenser (C), a second junction, a two-pole switch moveable contact, and one pole ($a$) of said two pole switch.

A by-pass circuit is in parallel with said capacitor between said first and second junctions having a resistance and a simple switch therein so that when said moveable contact is connected to said one pole ($a$) and said simple switch is closed the capacitor is charged, the charge being caused by light flashed from said flashing means onto an object and reflected onto said detector means.

The device has a servo circuit including a field effect transistor ($Tr_1$) with a gate and drain electrodes, said gate electrode being connected to said first junction, a second pole ($b$) for said two pole switch, a differential amplifier (DA) with an input and two output terminals and a servo amplifier (SA), said second pole and said drain electrode being connected to said differential amplifier (DA) input terminal. The first output terminal of said differential amplifier (DA) is connected to the servo amplifier (SA), said second output terminal of said differential amplifier (DA) is connected to a potentionmeter. A servomotor (SM) is connected to the servo amplifier, and gearing on said servomotor connected to the moving terminal of the potentiometer (RB) to move this terminal in response to the action of said servo motor (SM).

Finally, the action of the flashing light eliminates false steady signals. It is the flashing light that charges the capacitor which memorizes the distance information. A steady light will not produce such an action by the capacitor.

What I claimed is:

1. An automatic focusing device comprising in combination:
   a. flashing means (F), a slit (S) and a projection lens (LP) disposed to direct flashing light on an object;
   b. detector means (DT) and a detecting lens (LD) disposed to receive flashed light reflected from said object; said detector (DT) acting as a light slide rheostat and including two electrodes ($P_1$, $P_2$), a resistor (RP) and a photoconductive material (PC) interposed between one of said electrodes and said resistor, the other electrode being at one end of said resistor so that the electrical output between said two electrodes ($P_1$, $P_2$) varies with the position where a light beam strikes said photo conductive material (PC);
   c. a servo-circuit responsive to said detector means (DT) including a differential amplifier ($Tr_2$, $Tr_3$) with a field effect transister ($Tr_1$) coupled to said differential amplifier and said detector means, a potentiometer (RB) and a servo-amplifier (SA) coupled to said differential amplifier; and,
   d. a condenser (C) connected to said detector means (DT) and, a two pole switch ($S_2$) to connect said detector means first, to said servo-circuit, whereby light is first flashed from said flashing means onto an object and reflected onto said detector means to charge said condenser (C) and then switched over to said servo-circuit where, if the charge on said condenser is different from the output from said field effect transistor, the servo-motor will rotate to make up this difference moving the potentiometer at the same time so as to bring the objective lens (LO) into focus.

2. In an automatic focusing device, in combination:
   a. flashing means (F), a slit (S) and a projection lens (LP) disposed in front of said flashing means to direct flashing light on an object;
   b. detector means (DT) including detecting lens (LD) disposed to receive flashed light reflected from said object; said detector (DT) acting as a light slide rheostat and including two electrodes ($P_1$, $P_2$) a resistor (RP) and a photoconductive material (PC) interposed between one of said electrodes and said resistor, the other electrode being at one end of said resistor so that the electrical output between said two electrodes ($P_1$, $P_2$) varies with the position where a light beam strikes said photo conductive material (PC);
   c. a servo-circuit coupled to and responsive to said detector means (DT) including a differential amplifier ($Tr_2$, $Tr_3$) with a field effect transister ($Tr_1$) coupled to said differential amplifier and said detector means, a potentiometer (RB) and a servo-amplifier (SA) coupled to said differential amplifier; and,
   d. a condenser (C) connected to said detector means (DT) and, a two pole switch ($S_2$) to connect said detector means first, to said servo-circuit, whereby light is first flashed from said flashing means onto an object and reflected onto said detector means to charge said condenser (C) and then switched over to said servo-circuit where, if the charge on said condenser is different from the output from said field effect transistor, the servo-motor will rotate to make up this difference moving the potentiometer at the same time so as to bring the objective lens (LO) into focus.

3. In an automatic focusing device, in combination:
   a. flashing means (F), a slit (S) and a projection lens (LP) disposed in front of said flashing means so as to direct flashing light on an object;
   b. detector means (DT) including a detecting lens (LD) disposed to receive flashed light reflected from said object; said detector means (DT) serving as a light slide rheostat and including first and second electrodes ($P_1$, $P_2$), a resistor (RP) and a photoconductive material (PC) interposed between one of said electrodes and said resistor, the other electrode being at one end of said resistor so that the electrical output between said two electrodes varies with the position where a light beam strikes said photoconductive material (PC), said first electrode having a lead which can be connected to one terminal of a power source ($E_1$) said second electrode having a second lead connected to a series circuit ending in the second terminal of a power source ($E_1$);
   c. a series circuit having a diode (D) connected to said second lead, a first junction, a condensor (C), a second junction, a two-pole switch moveable contact, and one pole ($a$) of said two pole switch:
   d. a by-pass circuit in parallel with said capacitor between said first and second junctions having a resistance and a simple switch therein so that when said moveable contact is connected to said one pole ($a$) and said simple switch is closed said capacitor is charged, said charge being caused by light flashed from said flashing means onto an object and reflected onto said detector means;
   e. a servo circuit including a field effect transistor ($Tr_1$) with a gate and drain electrodes, said gate electrode being connected to said first junction, a second pole ($b$) for said two pole switch, a differential amplifier (DA) with an input and two output terminals and a servo amplifier (SA), said second pole and said drain electrode being connected to said differential amplifier (DA) input terminal, the first output terminal of said differential amplifier (DA) being connected to said servo amplifier (SA), a potentiometer (RB) with a moving terminal, said second output terminal of said differential amplifier (DA) being connected to said potentiometer, a servomotor (SM) connected to said servo amplifier, and gearing on said servomotor connected to the moving terminal of said potentiometer (RB) to move said terminal in response to the action of said servo motor (SM).

4. A distance measuring device comprising
   a light projecting means having a flashing device adapted to direct a light beam to an object the distance to which is to be measured;

a light receiving detector means comprising a light slide rheostat, the resistance of said detector means depending on the distance to be measured and the position thereof being spaced from said light projecting means;

lens means adapted to focus the image of the object illuminated by said light projecting means;

a condenser for integrating the output from said light receiving detector;

an amplifier having high input impedance and connected to said condenser; and an indicating means for indicating said integrated output from said condenser.

5. A distance measuring device as defined in claim 4 wherein said amplifier is a field effect transistor.

6. An automatic focussing device comprising a light projecting means having a flashing device adapted to direct a light beam to an object;

a light receiving detector means comprising a light slide rheostat, the resistance of said detector means depending on the distance to be measured and the position thereof being spaced from said light projecting means;

lens means adapted to focus the image of the object illuminated by said light projecting means;

a condenser for integrating the output from said light receiving detector means;

an amplifier having high input impedance and connected to said condenser; and a servo-motor driven by the output of said amplifier to thereby adjust the movement of an objective lens of said lens means.

7. An automatic measuring device as defined in claim 6 wherein said amplifier is a field effect transistor.

* * * * *